United States Patent [19]

Jones et al.

[11] Patent Number: 5,048,278
[45] Date of Patent: Sep. 17, 1991

[54] ROTARY CUTTING MEMBER FOR USE WITH LAWN MOWERS AND THE LIKE

[75] Inventors: Dallas W. Jones, New Hartford, N.Y.; Matthew F. Orr, Shawnee Mission, Kans.

[73] Assignee: Trim-a-Lawn, Utica, N.Y.

[21] Appl. No.: 409,004

[22] Filed: Sep. 18, 1989

[51] Int. Cl.⁵ .............................................. A01D 34/73
[52] U.S. Cl. ...................................... 56/295; 56/12.7; 30/276; 30/347
[58] Field of Search ..................... 30/276, 272.1, 277.4, 30/300, 303, 329, 347; 56/12.7, 17.5, 295, 255

[56] References Cited

U.S. PATENT DOCUMENTS

| | | | |
|---|---|---|---|
| 3,208,209 | 5/1963 | Dunlap et al. | 56/295 |
| 4,054,992 | 10/1977 | Ballas et al. | 30/276 |
| 4,054,993 | 10/1977 | Kamp | 30/276 |
| 4,062,115 | 12/1977 | Lee | 30/276 |
| 4,118,865 | 10/1978 | Jacyno | 30/276 |
| 4,126,990 | 11/1978 | Fisher et al. | 56/295 |
| 4,126,991 | 11/1978 | Gobin et al. | 56/295 |
| 4,186,239 | 1/1980 | Mize | 30/276 X |
| 4,186,830 | 2/1980 | Pittinger, Jr. | 30/276 |
| 4,232,505 | 11/1980 | Walto | 56/12.7 |
| 4,357,789 | 11/1982 | Rodish | 56/295 |
| 4,362,007 | 12/1982 | Kennedy et al. | 56/295 |
| 4,461,138 | 7/1984 | Whitman | 56/12.7 |
| 4,513,563 | 4/1985 | Roser et al. | 56/295 |
| 4,644,655 | 2/1987 | Bottamiller et al. | 30/347 |
| 4,685,279 | 8/1987 | Gullett | 30/276 X |
| 4,726,176 | 2/1988 | McGrew | 56/12.7 |
| 4,756,146 | 7/1988 | Rouse | 30/276 X |
| 4,825,627 | 5/1989 | Truderung | 30/276 X |
| 4,869,055 | 9/1989 | Mickelson | 30/276 X |
| 4,905,465 | 3/1990 | Jones et al. | 30/276 |
| 4,909,024 | 3/1990 | Jones et al. | 56/12.7 X |
| 4,962,630 | 10/1990 | Jones | 56/12.7 |

Primary Examiner—Frank T. Yost
Assistant Examiner—Rinaldi Rada
Attorney, Agent, or Firm—Shlesinger, Arkwright & Garvey

[57] ABSTRACT

An apparatus for holding a plurality of flexible cutting filaments having an angular cross-section for cutting grass and the like comprises a rotary member. The rotary member includes a hub for mounting the member to a drive shaft of a lawn mower or the like. The member includes a rim disposed around the hub. A disk secures the rim to the hub. The member includes at least a pair of passageways for securing at least one pair of flexible cutting filaments. The passageways are keyed to the cross-section of the cutting filaments and extend through the rim for permitting the filaments to be positioned within each respective passageway at a specific orientation. Each of the passageways extends through the rim at different elevations above the ground for permitting the cutting filaments to cut the grass at different heights.

19 Claims, 3 Drawing Sheets

ROTARY CUTTING MEMBER FOR USE WITH LAWN MOWERS AND THE LIKE

FIELD OF THE INVENTION

The present invention pertains to rotary cutting member for use with lawn mowers and the like, and particularly to rotary cutting members with flexible filaments.

BACKGROUND OF THE INVENTION

It is well known that conventional lawn mowers has the potential of inflicting great bodily harm or loss of life to the operator or nearby person. The metallic cutting blade customarily used in lawn mowers can permanently disfigure, or injure the operator or an innocent bystander. There are several situations where this may happen. For example, if the operator should slip and fall, a part of his body, such as a foot or an arm, may accidentally get underneath the lawn mower with grave consequences. In a case involving a self-propelled lawn mower, loss of control by the operator might cause the lawn mower to run away from the operator and injure another person. Lawn mowers are also known to have started on their own without any warning. For example, an operator cleaning under the lawn mower housing or fixing the blade might be injured when, without any warning, the lawn mower starts on its own. There are also cases where the operator or a nearby person has been hit by projectiles such as rocks, bottles, pieces of wood, etc., propelled by the lawn mower blade. Furthermore, lawn mowers are sometimes subjected to abuse wherein it is put to use for which is not intended, creating potential hazard to the operator. A case like this might involve the operator bodily lifting up the lawn mower and using it as a hedge trimmer.

To make the lawn mower safer to use, flexible cutting filaments have been used to replace the standard metallic blades. Use of flexible cutting filaments, however, has resulted in reduced cutting power, since the flexible cutting filaments have typically round cross-section. Where the filaments have angular cutting edges, the filaments tend to shift in their holder, which in most cases, result in having their cutting edges oriented away from the vegetation being cut. Also, rotary members used for holding the flexible cutting filaments typically include rigid arms or projections which have the potential of hurting or injuring an unwary operator or bystander.

OBJECTS AND SUMMARY OF THE INVENTION

It is therefore an object of the present invention to provide an improved rotary cutting member for use with lawn mowers and the like.

It is another object of the present invention to provide a rotary cutting member which will hold an angular cutting filament at the proper orientation for efficient cutting.

It is still another object of the present invention to provide a rotary cutting member with removably securable cutting filaments.

It is yet another object of the present invention to provide a rotary cutting member with cutting filaments which are not easily undone from their holder during use.

It is a further object of the present invention to provide a rotary cutting member which reduces early failure of the cutting filaments.

It is another object of the invention to provide a rotary cutting member that will relatively reduce the danger of bodily harm associated with the use of lawn mowers and the like.

It is a further object of the present invention to provide a rotary cutting member having a plurality of flexible cutting filaments for reducing wear and tear on the individual cutting filament.

It is still an object of the present invention to provide a rotary cutting member having a plurality of flexible cutting filaments securable at different elevations above the ground, thereby providing a plurality of cutting heights.

It is a further object of the present invention to provide a rotary cutting member without any rigid projections which might catch and injure any of the operator's body parts.

It is yet another object of the present invention to provide a rotary cutting blade with a smooth periphery for thereby reducing the potential for serious bodily injury from accidental contact with the rotary cutting member.

It is yet a further object of the present invention to provide a rotary cutting member that creates an upward suction for standing the vegetation before being cut.

It is still another object of the present invention to provide a rotary cutting member having means for mulching the cut vegetation.

It is another object of the present invention to provide a rotary cutting member having readily replaceable flexible cutting filaments.

In summary, the present invention provides an apparatus for cutting grass and the like, which is relatively safe to use, and which includes a plurality of flexible cutting filaments securable at different elevations above the ground and lockable at a specific orientation.

DETAILED DESCRIPTION OF THE INVENTION

Figure 1:
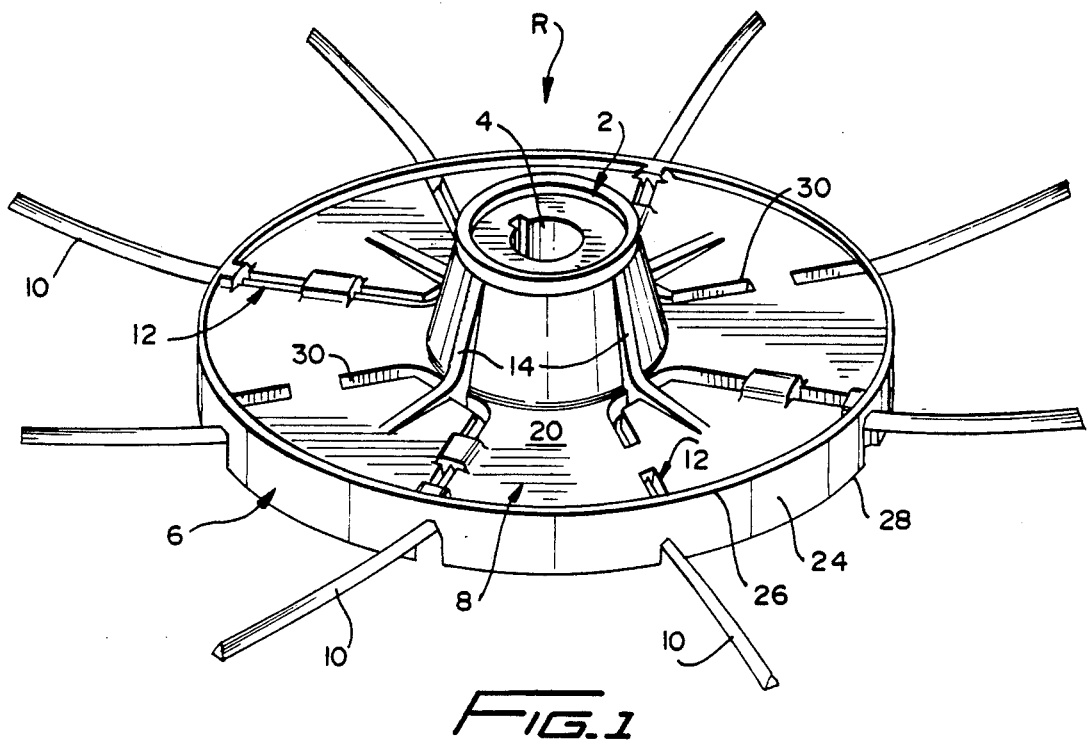
FIG. 1 is a top perspective view of the present invention.
Figure 2:
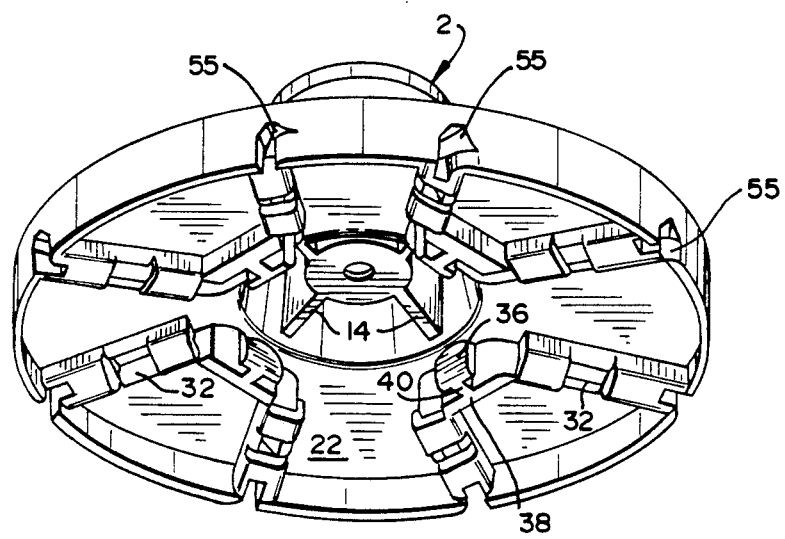
FIG. 2 is bottom perspective view of FIG. 1 with the cutting elements not shown.

A rotary cutting blade R according to the present invention is disclosed in FIG. 1. The cutting blade R includes a hub 2 for securing the cutting blade R to a lawn mower drive shaft (not shown) or other standard drive devices. The hub 2 has keyed opening 4 for engagement to the drive shaft (not shown). A cylindrical rim 6 is operably connected to the hub 2 by means of a disk 8. A plurality of flexible cutting filaments 10 are removably secured to the cutting blade R. The cutting blade R is preferably plastic and molded in one piece. Other materials may be used, such as cast metal.

The cutting blade R includes a number of U-shaped passageways 12 disposed in the disk 8 and opening through the rim 6, each of which secures one of the cutting filaments 10, as best shown in FIG. 1. Reinforcing ribs 14, each disposed in the hub 2 and midway each passageway 12, help strengthen the hub 2 and provide reinforcement to the disk 8.

Figure 3:
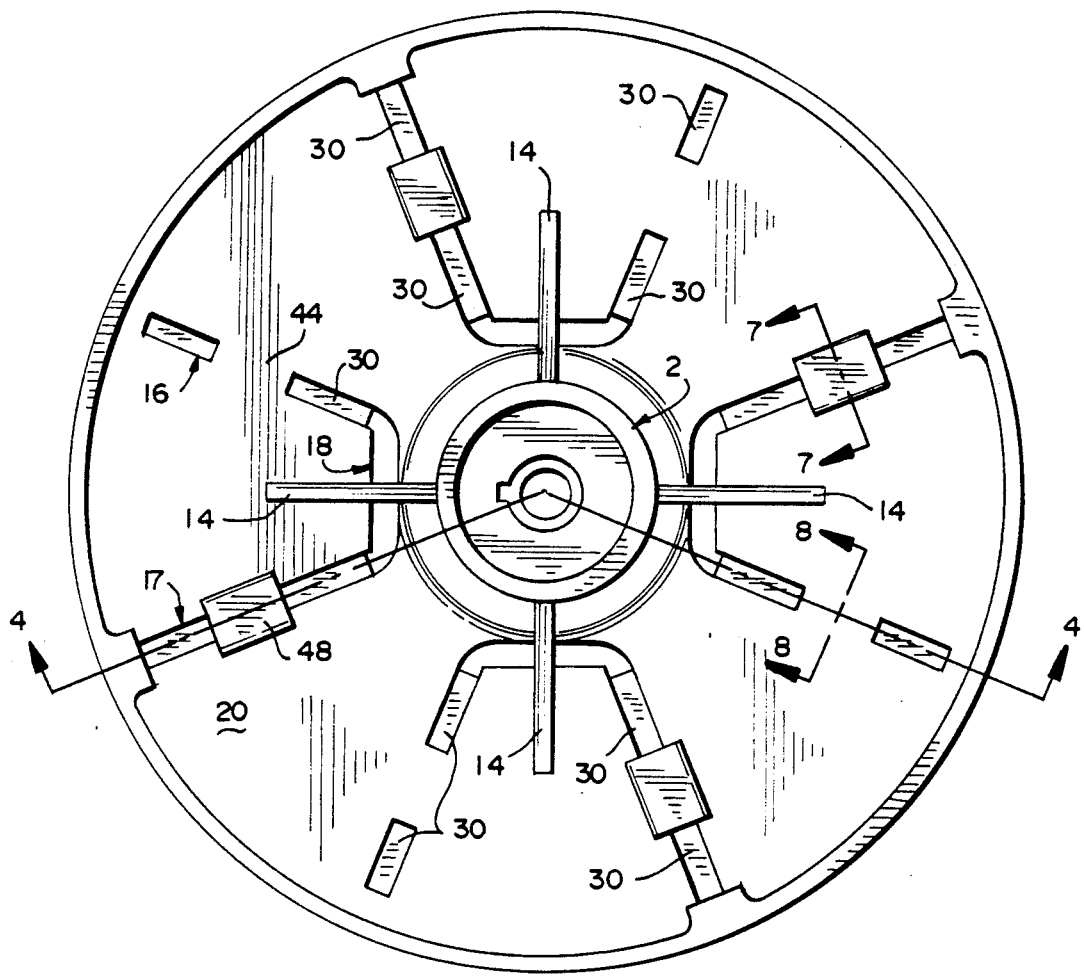
FIG. 3 is a top plan view of FIG. 1, with the cutting elements not shown.

Each passageway 12 includes leg portions 16 and 17 each extending radially outwardly from the hub 2. The leg portions 16 and 17 are joined together at a base portion 18 disposed adjacent the hub 2, thereby forming a U shape in plan view, as best shown in FIG. 3.

Figure 4:
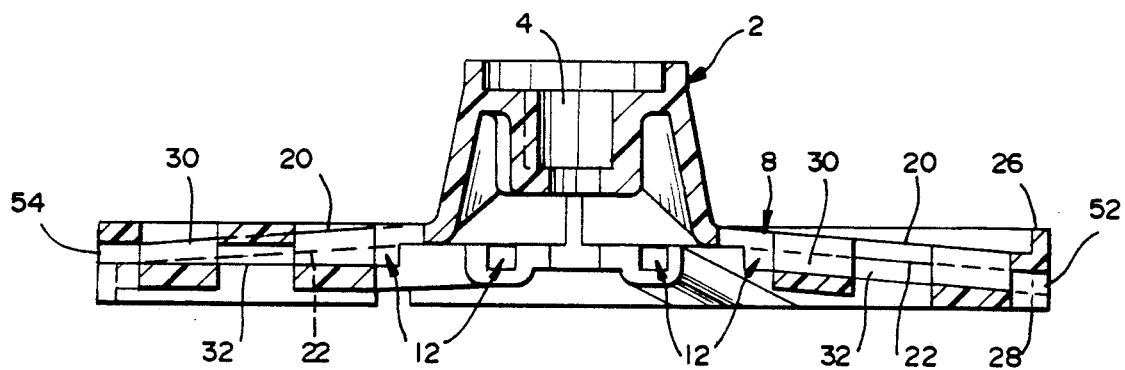
FIG. 4 is cross-section view taken along line 4—4 in FIG. 3.

The disk 8 includes upper and lower surfaces 20 and 22, respectively, which slope downwardly in the direction from the hub 2 to the rim 6, as best shown in FIG. 4. The upper and lower surfaces 20 and 22 are preferably parallel to each other.

The rim 6 includes an outer vertical cylindrical surface 24 and upper and lower edges 26 and 28, respectively. The disk 8 is preferably contained within the volume defined by the surface 24 and the upper and lower edges 26 and 28, thereby minimizing any vertically protruding parts from the cutting blade R which could catch and propel an object toward an operator or a nearby person, or worse, seriously injure a part of the body accidentally placed in the path of the cutting blade R.

Each passageway 12 projects through the rim 6. Except at the base portion 18, each passageway 12 is substantially continuous. Each passageway 12 includes openings 30 in the upper surface 20 of the disk 8, and openings 32 below the lower surface 22, as best in FIGS. 1, 2, 3 and 5. The openings 30 and 32 alternate along the longitudinal axis of each passageway 12. The base portion 18 of each passageway 12 is a through opening in the disk 8.

The leg portion 17 of each passageway 12 is preferably disposed substantially horizontally, while the leg portion 16 slopes downwardly from the hub 2 to the rim 6. The leg portion 16 terminates at the rim 6 at a distance above the termination point of the leg portion 16, as best shown in FIG. 4. This separation advantageously permits the cutting filaments 10 to cut the grass at two different heights above the ground.

Each passageway 12 includes a structure 34 for locking a cutting filament 10 within its respective passageway 12. The structure 34 is disposed adjacent the base portion 18 of each of the passageways 12. The structure 34 includes parallel, spaced apart wall portions 36 and 38 and a transverse wall portion 40. A lock channel 42 is thereby formed on each side of the transverse wall portion 40 in which a central portion of the cutting filament 10 is wedged.

Figure 7:
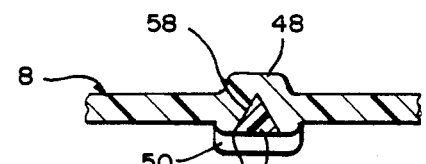
FIG. 7 is a fragmentary, cross-sectional view taken along line 7—7 in FIG. 3.
Figure 8:
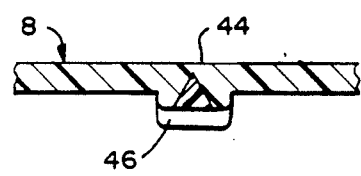
FIG. 8 is a fragmentary, cross-sectional view taken along line 8—8 in FIG. 3.

The leg portion 16 of each passageway 12 is formed with a top portion 44 which is flush with the upper surface 20, and a bottom portion 46 spaced from the lower surface 22 of the disk 8, as best shown in FIGS. 3 and 8. The leg portion 17 is formed with a top portion 48 which extends above the upper surface 20, and a bottom portion 50 below the lower surface 22, as best shown in FIGS. 3 and 7.

The leg portions 16 and 17 each extends through the rim 6 in openings 52 and 54, respectively, as best shown in FIG. 4. The opening 52 is disposed at a higher elevation than the opening 54 for allowing the cutting filament to be disposed at two different elevations. Convex curved surfaces 55 each disposed adjacent each of the openings 52 and 54 provide for stress relief for the cutting filament 10 during operation. The surfaces 55 are trailing in relation to the rotation of the cutting blade R, thereby providing bearing surfaces for the cutting filament 10 when the cutting filament 10 is bent backwardly as it encounters an obstacle.

The passageway 12 has a triangular cross-section, preferably equilateral, with a base surface 56 disposed in a horizontal orientation during normal use, as best shown in FIG. 7. Likewise, the cutting filament 10 is similarly shaped so that the filament 10 fits within the passageway 12 in a specific orientation.

The cutting filament 10 has sloped leading surface 58. The leading surface 58 forms a cutting edge 60 with the base surface. The sloped leading surface 58 helps create an upward suction to stand the vegetation before cutting and to lift the cut vegetation for mulching.

OPERATION

The cutting filament 10 is slid into a passageway 12 starting at either of the openings 52 and 54. Since the passageway 12 is alternately open at the top and at the bottom by means of openings 30 and 32, sliding friction is minimized when installing the cutting filament 10. The cutting filament 10 is slid into the passageway 12 until a first intermediate portion 62 is secured in the leg portion 17 and a second intermediate portion 64 is secured in the leg portion 16. A third intermediate portion 66 is then wedged into the locking channels 42 at the base portion of the passageway 12. The cutting filament 10 is thereby prevented from working itself loose from the passageway 12. End portions 68 and 70 extend beyond the rim 6. It will be noted that a substantial portion of the cutting filament 10 is secured in the passageway 12, which further helps, in addition to the locking structure 34, in keeping the cutting filament 10 secured to the cutting blade R.

Figure 5:
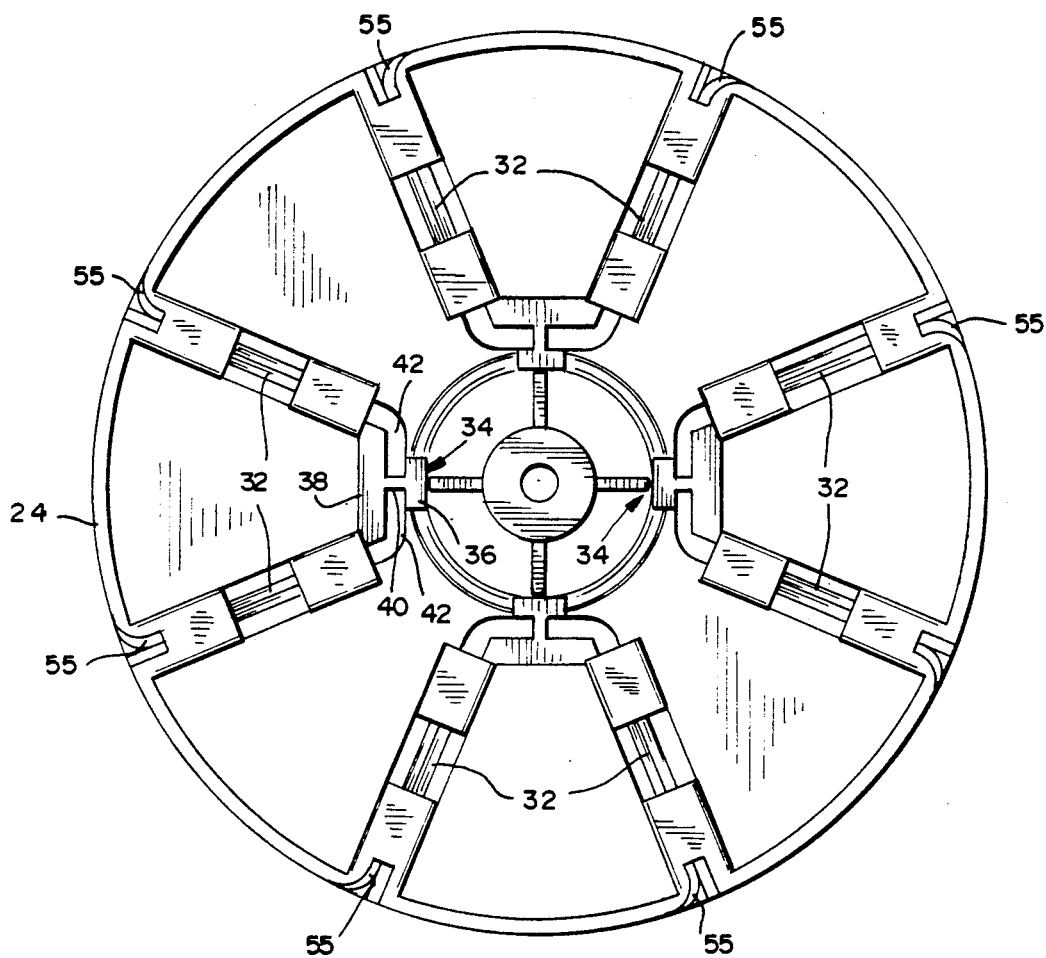
FIG. 5 is a bottom plan view of FIG. 2.
Figure 6:
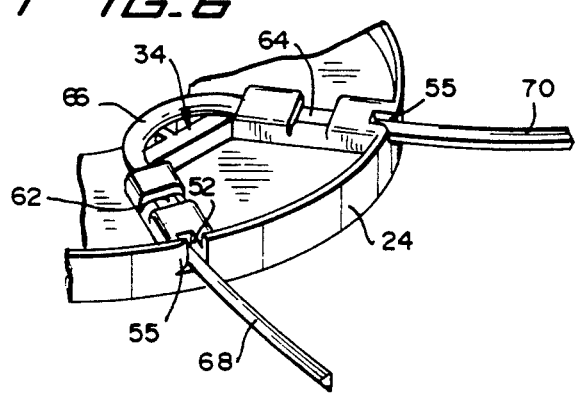
FIG. 6 is a fragmentary, bottom perspective view of the present invention, showing a cutting filament secured thereto.

During operation, the blade rotates in a clockwise direction as viewed in FIG. 1, or counterclockwise as viewed in FIG. 5. As the end portions 68 and 70 of the cutting filament 10 hit an unyielding obstruction, the unsupported portions bend backwardly against the curved surfaces 55 which act as bearing surfaces to take up the stress thus developed. This prevents early failure of the cutting filament 10. During rotation, end portion 70 will be leading end portion 68. Since the end portion 70 is situated at a lower elevation above the ground than the end portion 68, an upward suction is created which helps lift up the vegetation for cutting and lift up the cut vegetation for mulching. The trailing end portion 68 also will cut any vegetation missed by the leading portion 70, providing for a more relatively uniform cut.

One or all of the passageways 12 may be provided with the cutting filament 10. Although FIG. 1 discloses all the passageways 12 as being occupied by a cutting filament 10, a pair of passageways 12 directly opposite from each other for proper balance may be used with good results. If more cutting filaments 10 are used, the life of each one will be longer than if a lesser number is used.

When a cutting filament 10 fails, replacement is a simple operation. The failed filament is simply slid out and a new one is slid in.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:

1. An apparatus for holding a plurality of flexible cutting filaments having an angular cross-section for cutting vegetation, said apparatus comprising:
   a) a rotary member;
   b) said rotary member including a hub;
   c) said member including a rim disposed around said hub;
   d) said member including means for securing said rim to said hub;
   e) said member including means for securing first and second flexible cutting filaments;
   f) said filaments securing means including first and second passageways keyed to the cross-section of the cutting filaments and extending through said rim for permitting the filaments to be positioned within respective said first and second passageways at a specific orientation;
   g) each of said first and second passageways extending through said rim at different elevations above the ground for permitting the cutting filaments to cut the vegetation at different heights; and
   h) one of said first and second passageways extending radially horizontally and the other of said first and second passageways extending radially downwardly away from said hub to said rim.

2. An apparatus as in claim 1, wherein:
   a) said first and second passageways have the same cross-section as the cutting filaments.

3. An apparatus as in claim 2, wherein:
   a) said first and second passageways are triangular in cross-section.

4. An apparatus as in claim 3, wherein:
   a) said passageway triangular cross-section includes a base portion; and
   b) said base portion is substantially horizontal when said rotary member is disposed horizontally under normal operation.

5. An apparatus as in claim 1, wherein:
   a) said first and second passageways are substantially interconnected together to form a substantially U-shaped passageway in plan view; and
   b) said U-shaped passageway includes a base portion disposed adjacent said hub and first and second leg portions extending radially through said rim.

6. An apparatus as in claim 5, wherein:
   a) said member includes means, disposed adjacent said base portion of said U-shaped passageway, for locking an intermediate portion of a cutting filament that is threaded through said U-shaped passageway.

7. An apparatus as in claim 5, wherein:
   a) said member includes a plurality of reinforcement ribs operably associated with said hub and said rim securing means.

8. An apparatus as in claim 7, wherein:
   a) said member includes a plurality of said U-shaped passageway; and
   b) each of said reinforcement ribs includes a portion disposed radially on said rim securing means and operably associated with said base portion of each of said U-shaped passageways.

9. An apparatus as in claim 1, wherein:
   a) said rim securing means includes top and bottom surfaces;
   b) said first and second passageways each includes a longitudinal axis;
   c) each of said first and second passageways includes a plurality of openings along said longitudinal axis; and
   d) said plurality of openings are disposed alternately on said top and bottom surfaces.

10. An apparatus as in claim 1, wherein:
    a) said rim securing means includes a disk having top and bottom surfaces; and
    b) at least said top surface slopes downwardly from said hub to said rim.

11. An apparatus as in claim 10, wherein:
    a) said rim includes a vertical cylindrical surface and top and bottom edges; and
    b) said first and second passageways and said disk are disposed within a space bounded by said cylindrical surface and said top and bottom edges.

12. An apparatus as in claim 1, wherein:
    a) each of said first and second passageways includes an opening disposed in said rim;
    b) said opening includes leading and lagging portions relative to the rotation of said member; and
    c) each of said lagging portions includes a curved surface.

13. An apparatus for cutting vegetation, comprising:
    a) a rotary member;
    b) said rotary member including a hub;
    c) said member including a continuous rim disposed around said hub;
    d) said member including a disk operably associated with said rim and said hub;
    e) a plurality of flexible cutting filaments each having a triangular cross-section and including first and second portions extending outwardly from said rim;
    f) said member including a plurality of substantially U-shaped passageways keyed to the triangular cross-section of said cutting filaments for permitting each of said cutting elements to be positioned within each respective said U-shaped passageways at a specific orientation;
    g) each of said U-shaped passageways including first and second leg portions operably associated with said first and second portions of respective said cutting filaments; and
    h) said passageway first and second portions extending radially through said rim and terminating at different elevations above the ground at said rim for permitting each of said cutting filaments first and second portions to cut the vegetation at different heights.

14. An apparatus for cutting vegetation, comprising:
    a) a rotary member;
    b) said rotary member including a hub;
    c) said member including a rim disposed around said hub;
    d) said member including means for securing said rim to said hub;
    e) a flexible cutting element having an angular cross-section and having first and second end portions extending outwardly from said rim;

f) said member including means for securing said flexible cutting element;

g) said element securing means including first and second passageways keyed to the cross-section of said cutting element for permitting said cutting element first and second end portions to be positioned at a specific orientation;

h) said cutting element having first and second intermediate portions being operably associated with respective said first and second passageways;

i) each of said first and second passageways extending through said rim at different elevations above the ground for permitting said cutting element first and second end portions to cut the vegetation at different heights; and j) said first and second passageways extending radially from said hub to said rim.

15. An apparatus as in claim 14, wherein:
a) said member includes a plurality of said first and second passageways;
b) each of said plurality of first and second passageways includes an opening through said rim; and
c) each of said openings is spaced vertically and circumferentially from an adjacent opening.

16. An apparatus as in claim 14, wherein:
a) said first and second passageways are operably associated with said rim securing means.

17. An apparatus as in claim 14, wherein:
a) one of said first and second passageways extends radially horizontally and the other extends radially downwardly from said hub to said rim.

18. An apparatus as in claim 14, wherein:
a) said cutting element is triangular in cross-section; and
b) each of said first and second passageways is triangular in cross-section for cooperating with said cutting element.

19. An apparatus as in claim 18, wherein:
a) said triangular cross-section of each of said first and second passageways is equilateral and includes a base portion; and
b) said base portion is substantially horizontal during normal operation of the apparatus.

* * * * *